Aug. 7, 1934.    R. J. CASTENDIJK    1,969,206
DEVICE FOR GIVING LUMINOUS SIGNALS, PARTICULARLY
ADAPTED FOR AVIATION PURPOSES
Filed June 11, 1931    2 Sheets-Sheet 1

Inventor:
R. J. Castendijk,

Patented Aug. 7, 1934

1,969,206

UNITED STATES PATENT OFFICE 1,969,206

DEVICE FOR GIVING LUMINOUS SIGNALS, PARTICULARLY ADAPTED FOR AVIATION PURPOSES

Robertus Joan Castendijk, Eindhoven, Netherlands, assignor, by mesne assignments, to the firm of Carl Zeiss, Jena, Germany Application June 11, 1931, Serial No. 543,727
In Germany January 13, 1931

8 Claims. (Cl. 88—24)

This invention relates to a device for giving luminous signals particularly adapted for air traffic.

The object of the invention is in general to provide a projection device for aviation purposes, constructed in a simple and efficient manner, and which invention affords clear and distinct signals.

Another object of the invention is to provide a compactly built weather-vane for aviation purposes. This weathervane in accordance with the general features of the present invention may consist of a projection device which through a suitable light system projects on a screen a sign indicating the direction and/or the force of the wind.

The invention will be more clearly understood by reference to the accompanying drawings, representing, by way of example, one embodiment thereof.

Figure 2:
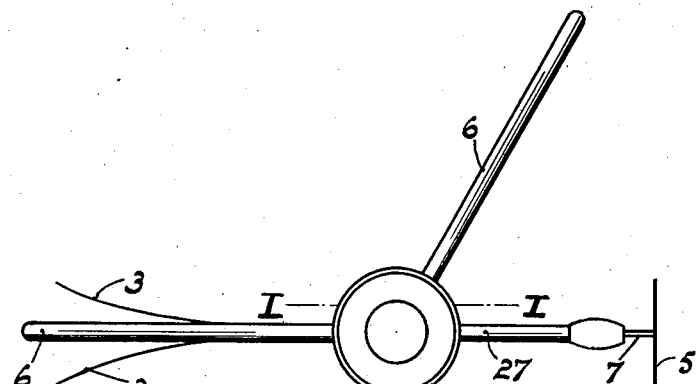
Fig. 2 is a plan view of the device according to Fig. 1.
Figure 3:
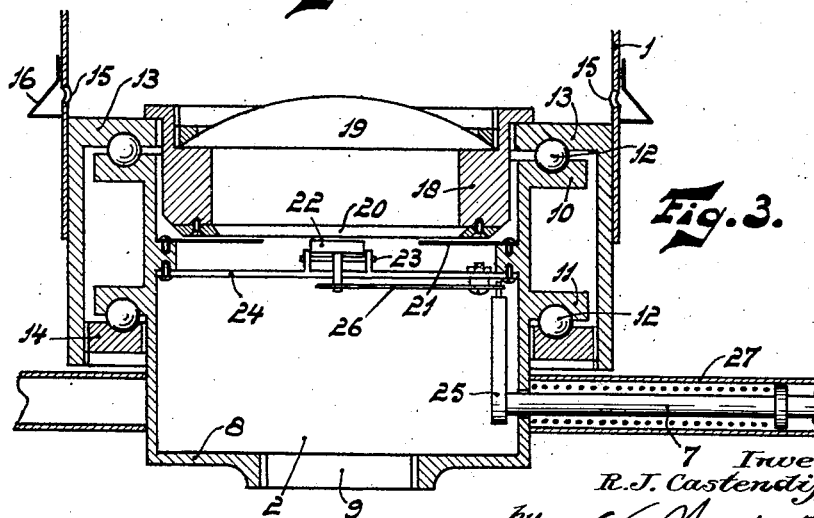

Fig. 3 a section on line I—I shown in Fig. 2.

Figure 4:
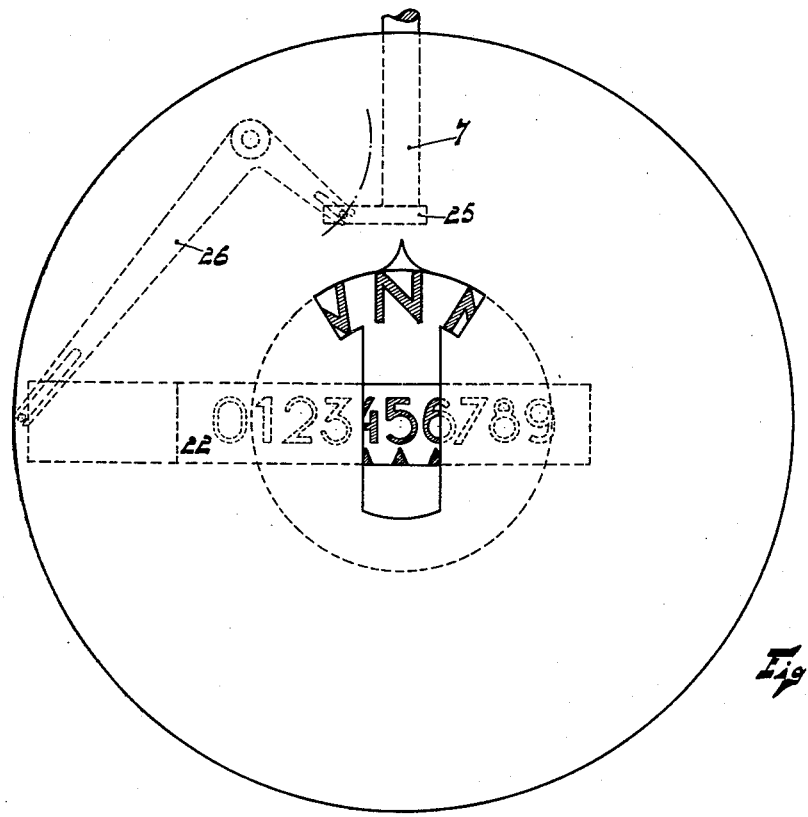

Fig. 4 is a top plan view of a portion of the apparatus, wherein the various signals to be projected are shown, this figure moreover showing the position of those parts on which these signals are provided.

Figure 5:
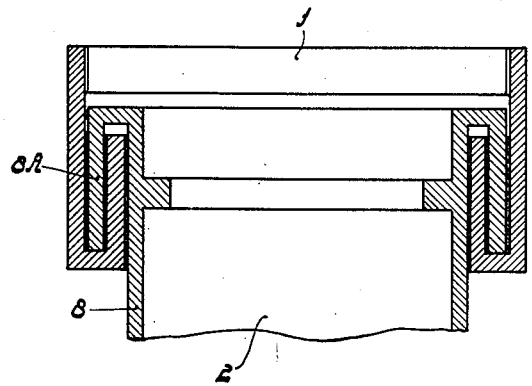

Fig. 5 is a detail of one form of bearing for the support of the movable part of the weather-vane in the stationary part thereof.

Figure 1:
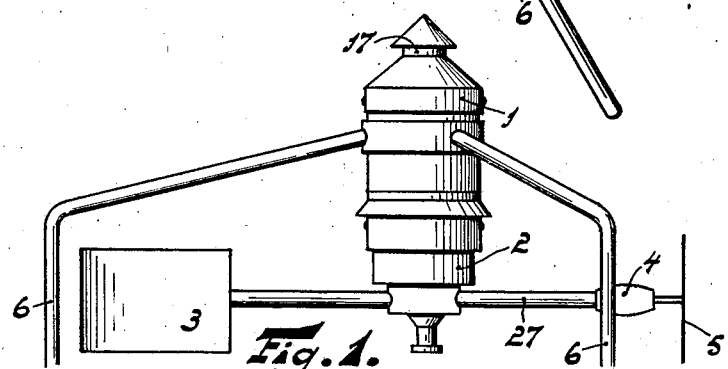
Fig. 1 is a side view of a weather-vane according to the invention.

In Fig. 1 the stationary part of a weather-vane is shown at 1. This part is supported by feet 6 and has movably fixed thereto a part 2 carrying the weather-vane proper which may be provided with rudder planes 3. The parts 1 and 2 together constitute a projection device. At the end opposite to the rudder the weather-vane is provided with a plate 5 which is fixed to a rod 7. This rod is movably mounted in a bearing 4 and is connected to a driving mechanism which may be mounted within the movable part 2 of the weather-vane (see Fig. 3).

The objective of the projection weather-vane is placed in the aperture 9 of the housing 8 of the movable part 2. This part carries upper and lower flanges 10 and 11 the upper and lower sides of which, respectively, are provided with annular grooves for the balls 12. The assembly fits in the body 13 whose upper portion is provided with an inner flange preferably having a groove co-operating with that of the flange 10 to form a race for the upper balls 12. The lower end of the body 13 is internally provided with a screw thread in which is screwed the ring 14. The upper side of this ring is likewise provided with an annular groove, cooperating with the groove in the flange 11 to form a race for the lower balls 12. It will be obvious that if the housing 8 and the body 13 together with the required balls in the grooves, are mounted one inside the other the housing 8 may freely rotate within the body 13. Threading in the ring 14 completes such assembly.

The body 13 carries the lamp housing 1 which is provided with a projection lamp (not shown) a suitable mirror, and air holes 15, said holes being drilled in the circumference of the lamp housing 1, whereas the air circulation is furthered by a funnel 17 (Fig. 1). Penetration of moisture through said air holes may be prevented by means of a rim 16, arranged about the stationary part.

Into the upper flange of the body 13 is screwed a ring 18 carrying the condenser lens 19 and the glass disc 20. The lower side of the disc 20 is provided with a compass card.

A templet 21 showing an arrow of the form shown in Fig. 4 is provided directly under the disc 20 and is connected to the housing 8 of the movable part 2. This arrow may move under the disc 20 in such manner, that the different indications of the compass card appear in the head of the arrow.

Under the templet 21 is provided a glass strip 22 which may slide to and fro over two rolls 23 carried by a holder 24 fixed in the housing 8. The glass strip 22 extends at right angles to the arrow. A scale division consisting of the figures 0 to 9 is provided on the upper side of the glass strip 22 in such manner that two full figures are always visible in the breadth of the arrow.

A weather-vane, essentially consisting of two tubes, is connected to the movable lower part 2 of the projector lantern. The templet 21, the glass strip 22, and the glass disc 20 contained in the lantern housing constitute as it were, the transparency to be projected. At the rear part of the weather-vane are provided the usual rudder planes or fins 3 (Fig. 1). The rod 7 passes through the tube constituting the front half of the weather-vane. This rod carries at the outer end a plate 5 which is preferably made of a light metal and on which the wind may exert pressure. The other end of the rod 7 is provided with a lever 25 bearing on one arm of the lever 26 (see also Fig. 4). By means of a helicoidal spring of definite strength which is contained in the tube 27, the rod 7 is pressed towards the exterior.

As soon as the wind exerts a pressure on the metal front plate of the weather vane against the action of the helicoidal spring, the glass strip 22 is carried along by the lever 26. It will be obvious that the pressure exerted depends on the force of the wind. Consequently the glass strip 22 together with the figures provided thereon moves from the right to the left and conversely. In the arrow cut out in the templet 21 there is consequently visible a letter of the glass compass card 20 which is arranged above it, and in addition a figure indicating the force of the wind (Fig. 4).

Fig. 5 shows a particularly advantageous bearing of both parts 1 and 2. The housing 8 of the part 2 is provided with an annular flange 8A which is immersed in the mercury bath provided in the stationary part 1. Consequently the part 2 swims on the mercury. This bearing constitutes a particularly simple and almost frictionless bearing, while an exact finishing of the parts engaging each other is not necessary.

The whole weather-vane may be arranged in a suitable manner above a brightly painted surface. If the projector lamp is lighted, the arrow is brightly outlined on this surface. By means of one or more characters of the compass card the projected image shows at the same time the direction of the wind and moreover the wind force expressed in relative figures. The size of the image depends on the distance between the projection device and the plane of projection or the projection screen.

A projection weather vane of this type will render excellent services on flying grounds. The sharpness and the brightness of the image at least equals and may even exceed those of a large weather vane which is illuminated by means of lamps provided thereabove, of the type used at present.

Furthermore, such large and directly lighted weather vanes of the prior art require a heavy construction together with heavy ball bearings provided on huge masts. Consequently these weather vanes are expensive and indicate the direction of the wind only without indicating in any manner the actual directions north and south etc., nor the force of the wind. Moreover, if the wind is not strong, such a vane is not very sensitive because of its considerable weight.

In the day-time the pilot depends to a lesser extent on a weather vane, since there are a large number of other visible means indicating the direction and the force of the wind; for example, the smoke from chimneys etc.

Because of the fact that the projection weather vane, according to the invention has a simple and light construction, may be rendered sensitive to any desired extent, and mounted in a simple manner, and because it gives valuable data for the pilot as to the action, direction, and force of the wind, its use is not limited to a few large airports, but has a wide application, extending to fields serving for forced descents, and to conspicuous points lying in the flying route.

This is very advantageous for air navigation since the pilot by means of the indications given by the device is enabled to correct his course.

For the navigator on board a plane it is very difficult to determine the course deviation due to the side wind, at least if he does not fly directly into or with the wind. This difficulty is rendered still greater by the fact that the wind does not always have the same force (the average values may materially vary during relatively short time intervals) and moreover, since the direction of the wind may always vary. Consequently, if a pilot steers a definite course, which he has previously determined in connection with the exact position of the starting point and of his destination, and if he maintains this course, then the force of the wind blowing during his flight continuously varies and causes deviations from his straight flying course. Even if he has previously corrected his course in accordance with the direction and the force of the wind blowing at his departure, it is not certain that his actual flying course will not be strongly influenced by the wind he encounters on his flight.

Even if the information about the weather is received by wireless during the flight it is always more or less insufficient, since said information is obtained at points which are distant from the actual position of the plane. If the information received tells him that the wind force at Amsterdam, Brussels and London, for example, is 5, 3 and 6 respectively and the direction W. NW. and W., there is no sure indication that he does know that when flying over Ostend he is flying in a current of air having a force 4—5. In the day-time this is not a great drawback but in the dark it constitutes a serious difficulty.

It is old to provide during day-time on different flying grounds lying along the flying courses large shields indicating figures and signs so as to inform the pilot passing said grounds concerning the direction and the force of the wind. By night the necessity of indicating definite signs becomes more urgent, the more so since the pilot is deprived of most of the signs which are available during day-time, even apart from the said shields.

It has already been proposed to also provide the shields on the flying grounds at nighttime. This requires separate meteorologic observations and in addition strongly lighted shields which furthermore must be continuously interchanged. A projection weather vane according to the invention performs all these functions automatically.

The means of projection may also be used for substituting the weather-code shields above referred to. For this purpose it is advantageous to use a device according to the invention comprising a projector lantern projecting its image likewise on the said horizontal plane of projection and in which a transparent display is used on which all other usual figure and sign indications concerning the height of the clouds, distance of sight, etc., are provided.

The data about the wind above referred to are projected entirely automatically, but the other meteorologic information must be made visible to the pilot by adjusting the said display by hand. If desired, the adjustment of the display may be effected according to the principle of the ship telegraph; in other words, by means of adjustment at a distance from the airport office.

On each flying ground may be readily provided a suitable plane of projection, for example, on a flat roof. One advantage of the combination of the projection whether vane and a second projection device consists in that all of the data which a pilot desires to see on the flying ground may be assembled on one shield.

In America many lighted names of towns and particular direction indicators are already provided on the roofs of the suitable buildings thereof, which are exclusively provided for air traffic purposes and which constitute undoubtedly a valuable means for the pilot for orienting himself. By providing a projection device according to the invention the risk is avoided that a pilot unexpectedly finds himself flying over a point lying entirely outside of his course, since he receives information on the route by means of which course deviations may be avoided, i. e. first of all an exact indication concerning the direction and the force of the wind.

Finally the projection weather vane, when it is provided on a flying ground, may be used for giving particular information to the pilot when arriving, for example, by giving a signal informing the pilot whether or not he is permitted to land. Hitherto this signal consisted in the firing of one or more red rockets signalling a landing prohibition and green rockets indicating permission to land.

Since the pilot before landing determines first of all the direction of landing, which depends on the wind direction and thus on the position of the weathervane, it is of evident convenience to also use the vane projector for giving the danger signal (red) or the clear signal (green). By merely adding a light filter to the projection weather vane, which filter may be adjusted at a distance, the image of the weather vane may be coloured red or green at will.

What I claim is:

1. A projecting device for air traffic comprising a stationary part and a rotating part cooperating therewith, said stationary part having a casing, a condenser lens and a templet within said casing, said rotating part comprising an indicator the picture of which is to be projected and an objective, and means adapted to be actuated by the wind and to actuate said indicator.

2. A projecting device for air traffic comprising a stationary part and a rotating part cooperating therewith, said stationary part having a casing, a condenser lens and a templet within said casing, said rotating part comprising an indicator, and a weather vane connected to said rotating part to rotate said rotating part.

3. A projecting device for air traffic comprising a stationary part and a rotary part, said rotary part comprising an indicator rotating therewith and a second indicator reciprocally mounted relative to the rotary part, a weather vane connected with the rotary part to cause the first indicator to assume the direction of the wind, said vane also comprising a member reciprocally mounted therein and adapted to be displaced in accordance with the strength of the wind, said member being connected with the second indicator to impart a lateral displacement thereto, and projecting means for projecting an image of the indicators and templets on a surface.

4. A projecting device for air traffic comprising a stationary part and a rotary part, a weather vane connected to said rotary part and indicators within said rotary part to automatically indicate the strength and direction of the wind, said device also being adapted to carry manually operated indicators, and a common objective placed in said rotary part to project all indicators on a single surface.

5. In means for indicating the condition of the wind within an area to aircraft, a stationary templet, a compass card on said templet, one or more movable templets with which said stationary templet cooperates and which have signs indicating the direction and the force of the wind, a driving mechanism driven by the wind and to which said movable templets are connected, and an illuminant having at least one lens for projecting an image of said templets on a surface.

6. In means for indicating the condition of winds, a stationary housing containing a lightsource and a condensor lens, a stationary templet having a compass card, member rotatably attached to said housing, and a wind-vane carried by same, a rotatable templet cooperating with said stationary templet and carried by said member, said rotatable templet having a sign in the shape of an arrow, said part also carrying a templet which cooperates with said first mentioned templets and to which a translating movement is given by a rod enclosed in the shaft of the wind-vane, said rod being provided at one end with a plate on which the wind can exert a force against the action of a spring, the said condenser lens being adapted to project an image of the indicators and templets on a surface.

7. Means for indicating the strength of the wind comprising a projector and a housing therefor, and an indicator reciprocally mounted within said housing, a rod and a plate carried thereby, said rod being displaced by the force exerted on the plate by the wind, and means to transmit the displacement of the rod on said indicator.

8. A projecting device for air traffic comprising a stationary part and a rotating part cooperating therewith, said stationary part having a casing, a condenser lens and a templet within said casing, said rotating part comprising an indicator, a weather vane connected to said rotating part, a laterally displaceable other indicator disposed within said rotating part, a laterally slidable member carried by said vane and projecting within said rotating part, and means to transmit the movement of said member to said other indicator.

ROBERTUS JOAN CASTENDIJK.